UNITED STATES PATENT OFFICE.

ALBERT A. SOMERVILLE, OF FLUSHING, NEW YORK, ASSIGNOR TO NEW YORK BELTING & PACKING COMPANY, A CORPORATION OF NEW YORK.

ARTIFICIAL LEATHER.

1,337,802.   Specification of Letters Patent.   Patented Apr. 20, 1920.

No Drawing.   Application filed January 15, 1918. Serial No. 211,921.

*To all whom it may concern:*

Be it known that I, ALBERT A. SOMERVILLE, a citizen of the United States, residing at Flushing, L. I., county of Queens, and State of New York, have invented certain new and useful Improvements in Artificial Leather, of which the following is a full, clear, and exact description.

This invention relates to process for producing material in imitation of leather and to the products obtained thereby.

Heretofore many articles such as footwear, trunks, traveling bags, automobile equipment, etc., have been made of real leather characterized by a dull smooth finish, one type of which is popularly known as "gun-metal." The scarcity and consequent high cost of leather is rapidly rendering its use prohibitive, and accordingly, it is an object of the present invention to provide an artificial leather having the appearance, texture, flexibility, and in general the characteristics of dull finished leather.

A further object of the present invention is to provide a simple, inexpensive, and effective process for manufacturing such material.

Other objects of the invention will hereinafter appear.

In carrying out the preferred process for the production of the preferred material, a sheet provided with a surface of unvulcanized rubber stock is first prepared. Various rubber compounds may be employed in the production of the sheet. Preferably the sheet comprises a foundation of fabric coated on one or both of its sides with rubber which may be applied by the friction, spreading, skincoat or other processes. Any suitable color or tone may be imparted to the rubber by the use of suitable agents, for example, when the sheet is intended to imitate gun-metal finished leather, carbon black may be admixed with the rubber compound.

In order to impart to the completed product the dull smooth finish desired, the vulcanizing process is carried out with the rubber surface of the sheet in contact with paper, of which various kinds may be used, for example, paraffin, Glacine, oiled, waxed, super-calendered, etc. The paper is applied by winding a strip thereof and a sheet of rubber-stock together face to face upon a roll or drum. The ends of the roll thus formed are then sealed in any suitable manner to prevent injurious fluids from working in between the successive plies of the material during the vulcanizing treatment. After the roll has been prepared in this manner it is placed in a vulcanizer and subjected to the action of a vulcanizing medium. Any of the various media capable of effecting vulcanization may be employed. It has been found that satisfactory results can be obtained by the use of live steam under pressure. When the desired degree of vulcanization has taken place the roll is unwound and the paper is stripped off the finished surface of the sheet. The paper separates freely from the rubber, leaving a product characterized by a dull, smooth, uniform finish in perfect imitation of real leather, and possessing the texture, flexibility, and other general properties thereof. A further valuable feature of the material is that its finished surface can be polished with the same results as real leather, by the use of the various stains and dressings ordinarily used on leather.

As many apparently widely different modifications of this invention may be made without departing from the spirit and scope thereof, it is to be understood that I do not intend to limit myself to the specific embodiment herein set forth except as indicated in the appended claims.

Having thus described my invention what I claim and desire to protect by Letters Patent is:

1. A process of the kind described, which comprises winding into a roll a vulcanizable rubber layer and sheet of paper in intimate surface contact with one another, subjecting said roll to the action of a vulcanizing medium, and removing said paper sheet, thereby providing a material having the appearance, texture, flexibility, and in general the characteristics of dull finished leather.

2. A process of the kind described, which comprises winding into a roll a vulcanizable rubber layer and sheet of paper in intimate surface contact with one another, the contacting surface of said paper sheet being smooth finished, sealing the ends of said roll against the entrance of deleterious fluids, subjecting said roll to the action of a vulcanizing medium, and removing said paper, thereby providing a material having the appearance, texture, flexibility, and in general the characteristics of dull finished leather.

Signed at New York, N. Y., this 11th day January, 1918.

ALBERT A. SOMERVILLE.